Figure 1:
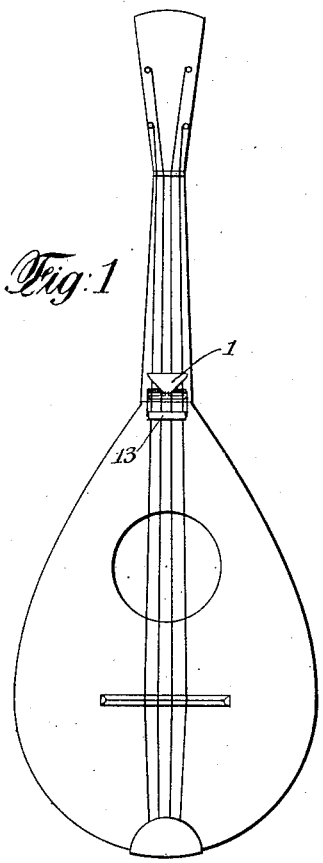

D. E. HARTNETT.
EXERCISING DEVICE FOR STRINGED INSTRUMENTS.
APPLICATION FILED MAR. 2, 1911.

1,047,217.

Patented Dec. 17, 1912.

2 SHEETS—SHEET 1.

Witnesses:
Minerva Lobel
Marian Merkle

Inventor
Dennis E. Hartnett
By his Attorneys
Prindle & Wright

D. E. HARTNETT.
EXERCISING DEVICE FOR STRINGED INSTRUMENTS.
APPLICATION FILED MAR. 2, 1911.
1,047,217.
Patented Dec. 17, 1912.
2 SHEETS—SHEET 2.
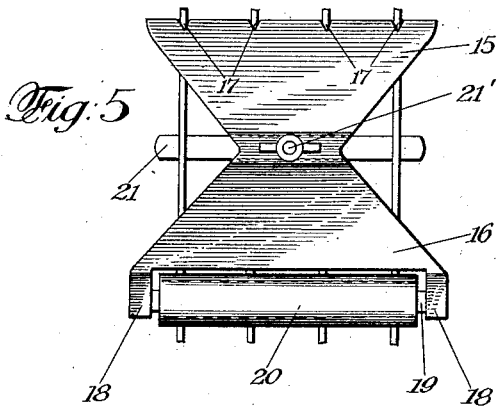
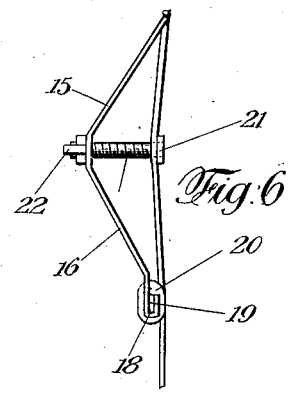
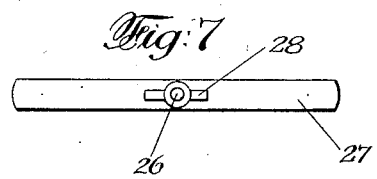
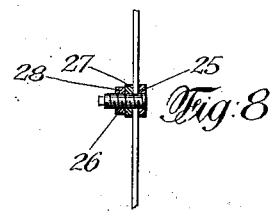
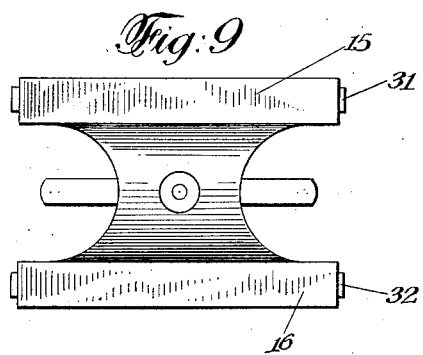
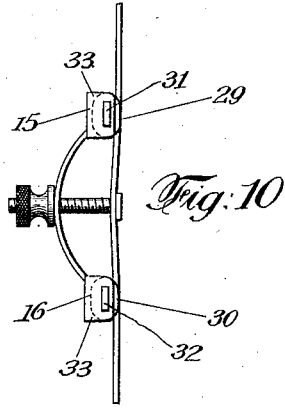
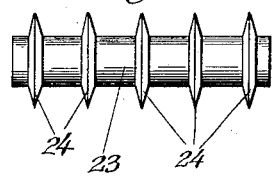
Witnesses:
Minerva Lobel
Marian Minkle
Inventor
Dennis E. Hartnett
By his Attorneys
Pindle & Obright ic
UNITED STATES PATENT OFFICE.

DENNIS EDWARD HARTNETT, OF NEW YORK, N. Y.

EXERCISING DEVICE FOR STRINGED INSTRUMENTS.

1,047,217. Specification of Letters Patent. Patented Dec. 17, 1912.

Application filed March 2, 1911. Serial No. 611,822.

*To all whom it may concern:*

Be it known that I, DENNIS E. HARTNETT, of New York, in the county of New York, and in the State of New York, have invented a certain new and useful Improvement in Exercising Devices for Stringed Instruments, and do hereby declare that the following is a full, clear, and exact description thereof.

My invention relates particularly to an apparatus adapted to stringed instruments which materially assists in the progress of a student in learning to play the particular stringed instrument to which it is attached.

There are three fundamental elements in music: time, technic and tune. Usually, in teaching music on a stringed instrument, the tune is produced at all times during practice and it is the experience of all instructors in music that the tune occupies the major portion of the pupil's attention. The two remaining elements of music, time and technic, are the ones which are being acquired by the pupil in learning to play the particular instrument. The tune is a mere incidental result of the elements time and technic. When, therefore, under the old system of learning an instrument, the tune is produced at the same time the elements of time and technic are being acquired, the major portion of the attention is diverted away from the particular elements, time and technic, which alone it is necessary to acquire to become a musician.

The object of my invention is to provide an attachment for stringed instruments of all kinds, but especially banjos, mandolins, guitars and violins, by means of which the tune can be suppressed entirely or in part so that the attention can be focused exclusively upon the elements, time and technic. My attachment is such, furthermore, that it may be used as a mute for suppressing more or less of the volume of the sound produced, according to the position in which the attachment is applied.

A further object of my invention is to provide such an attachment for stringed instruments that it can readily also be used as a capo tasto, that is to say, for clamping the strings below the top of the neck in such a manner that the pitch of the strings is permanently raised.

My invention comprises, in general, an apparatus which may be attached to or placed upon the strings of the instruments. Preferably this apparatus is of a yielding nature so as to form a cushion for the strings as they vibrate and so as not to change their pitch. It is constructed, furthermore, in such a manner that the tension may be varied to adapt it to the varying tensions of the strings of the different instruments.

I have shown certain different forms of my invention in the accompanying drawings, in which—

Figure 2:
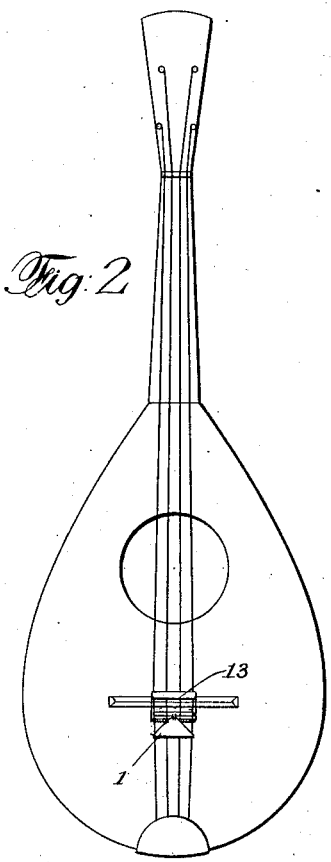
Figure 3:
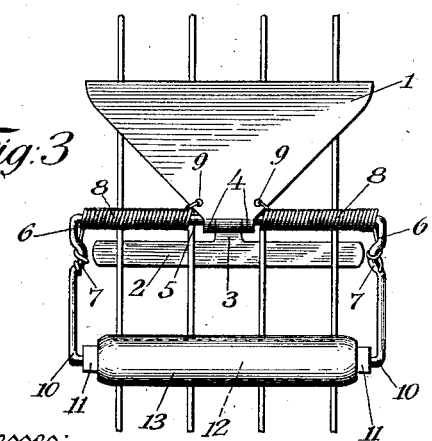
Figure 12:
Figure 4:
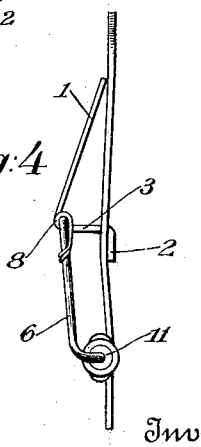

Figure 1 is an elevation of a mandolin equipped with my preferred form of exercising device, shown in the first position. Fig. 2 is a similar view of a mandolin showing the exercising device in the second position. Fig. 3 is an enlarged detail of the exercising device shown as supported upon four strings. Fig. 4 is a side elevation of the same. Fig. 5 is a similar view to the view shown in Fig. 3, but showing another modification of the exercising device. Fig. 6 is a side elevation of the apparatus shown in Fig. 5. Fig. 7 is a plan view of still another modification. Fig. 8 is a cross-section of the same, shown in the position in which it is applied to the strings. Fig. 9 is a plan view of still a further modification. Fig. 10 is a side elevation of the same, as applied to the strings. Fig. 11 is a plan view of a modified form of rubber tube to be applied to certain of the modifications, and Fig. 12 is a vertical section taken through the tube 13 of Fig. 3.

In the modification shown in Figs. 1 to 4, 1 indicates a brass plate having a rearward T-shaped extension 2 directed downwardly from the plate 1 and connected thereto by a bar 3. At a point where the bar 3 joins the plate 1, a pair of journal bearings 4 is provided to receive a wire 5. The wire 5 is bent at right angles at its two ends to form arms 6. Each of the arms 6 is provided with an indentation 7 to receive the end 5 of springs 8 which are carried upon the wire 5 at either side of the journal bearings 4, the other end of each of the springs being secured to the plate 1 by passing through holes 9 therein. The arms 6 at their ends are bent inwardly at right angles so as to act as journals 10 for a tube 11 which is flattened at its center 12. The tube 11 is covered with a piece of rubber tubing 13 which is of such a size as to leave a space between the flattened portion 12 and the rubber tube 13.

In the modification shown in Figs. 5 and 6, I provide a plate 15 similar in construction to plate 1 shown in the other modification but extended beyond its narrow portion to produce a similar plate 16. The plate 15 carries a number of notches 17 to coincide with the strings of the instrument. The plate 16 has the central portion of its outer end cut out forming a pair of ears 18 to receive the bar 19, the ends of the bar 19 being extended over the ears 18, and the ears 18 being bent over the ends of the bar 19 to hold it in position. The bar 19 carries in the cut-out portion of the plate 16 a rubber tube 20. A bar 21 is provided at the center of the apparatus, said bar having attached to its center a screw-threaded arm 21', said arm being passed upwardly through the point of union of the plates 15 and 16, and carrying at its upper end a thumb-screw 22.

In Fig. 11, I have shown another form of rubber tube 23 which may be applied to either of the modifications already described in place of the rubber tubes 13 and 20. The rubber tube 23 is constructed with a plurality of circular ridges which fit between the strings of the instrument to which the apparatus is applied.

In Figs. 7 and 8, I have shown still another modification of the exercising device. This comprises merely a bar 25 having at its center an upwardly directed screw-threaded arm 26 which is adapted to pass through a similar bar 27. The arm 26 is provided with a thumb-screw 28.

In Figs. 9 and 10, I have shown still another form of my invention which is constructed in the same manner as the modification shown in Figs. 5 and 6, except that I provide the outer edges of the plates 15 and 16 with rubber tubes 29 and 30, which rubber tubes are carried upon bars 31, and 32 supported in ears 33 which extend downwardly from the sides of the plates 15 and 16 adjacent their outer edges.

In the operation of the modification of my invention shown in Figs. 1 to 4, the end of the plate 1 is so located with relation to the rubber tube 13 that by springing these two parts with regard to each other, the spring 8 may be wound up to any extent desired, thereby increasing the relative tension between the plate 1 and the rubber tube 13, as desired. In applying the apparatus to a banjo, a comparatively small amount of tension is required as the strings of a banjo are not stretched very tight. When, however, the device is applied to a mandolin or violin, a greater tension must be applied and the tension upon the springs 8 is therefore, increased in the manner indicated above, by rotating the plate 1 one or more times through the yoke formed by the arms 6. When the device is to be applied to a guitar a still greater tension must be used and the plate 1 is rotated one or more times in addition through the yoke formed by the arms 6. There are two positions in which the device is used upon an instrument. One will be referred to as the first position—a position in which it overlies the lower end of the fret-board thereof,—and the other position will be referred to as the second position,—a position in which it straddles the bridge. When used in the first position, the device is applied by inserting the bar 2 between any two adjacent strings of the instrument and then moving the device through an angle of 90°, and then allowing the plate 1 and the rubber tube 20 to be released so that they press downwardly upon the tops of the strings. The position of the parts should now be such that the end of the device carrying the rubber tube is directed toward the bridge. When an instrument is played with the exercising device applied in this manner, the tones of the instrument are partially suppressed. As a consequence, the pupil's attention is concentrated entirely upon the time and technic of the music and the particular selection can therefore, be learned much more rapidly than with the old method where only a small fraction of the attention can be placed upon the elements of time and technic, the two elements of music which it is alone necessary to acquire. When applied in the second position, the bar 2 is inserted between any two adjacent strings located below the bridge, the device is rotated and the plate 1 and the rubber tube 13 are released so as to press upon the tops of the strings, the device being applied in this instance with the rubber tube 13 above the bridge and the plate 1 below the bridge. When used in the second position, the device may be used as a mute, and by shifting its position a graduated volume of sound can be produced.

The modification shown in Figs. 5 and 6 is applied to an instrument and is used in exactly the same manner except that the thumb-screw 22 must be operated to supply the required amount of tension to the strings. This modification of my invention is especially adapted for use as a capo tasto. When so used, the attachment is applied at any position upon the neck of the instrument with the plate 15 directed toward the bridge. The tension of the attachment is then increased by the operation of the thumb-screw 22 until there is no vibration of the strings above the attachment. By means of this, the pitch of the strings is permanently raised.

The modification shown in Figs. 7 and 8 operates in the same manner as the modification shown in Figs. 5 and 6, it being necessary to operate the thumb-screw 28 to provide the required amount of tension.

The operation of the modification shown in Figs. 9 and 10, is the same as the operation of the modification shown in Figs. 5 and 6, except that instead of having the outer edges of the plates 15 and 16 bear upon the strings of the instrument, the rubber tubes 29 and 30 bear upon the upper surface of said strings.

Where a rubber tube, such as that shown in Fig. 11 is used, the ridges 24 fall between the strings of the instrument and contact with the strings not only at the top but also at the side. The notches 17 in the plate 15 or in the similar plate 1 hold the device in position by engaging the strings during the vibrations of the strings which are produced by the playing of the instrument.

While I have described certain modifications of my invention above in detail, I wish it to be understood that many changes may be made therein without departing from the spirit of my invention.

I claim:

1. A damping device for plucked and bow instruments, comprising two end engaging means and an intermediate engaging means to partially suppress the sound, wholly supported by the strings and engaging the vibratory portions of the strings of one of said instruments, and movably supported by the strings.

2. A damping device for stringed instruments, comprising two end engaging and an intermediate engaging means wholly supported by the strings, and engaging the vibratory portions of the strings to partially suppress the sound, and means for moving the intermediate engaging means in opposition to the plane of the other two engaging means.

3. A damping device for stringed instruments, comprising two end engaging means and an intermediate engaging means wholly supported by the strings and engaging the vibratory portions of the strings to partially suppress the sound, and a spring for moving the intermediate engaging means in opposition to the plane of the two other engaging means.

4. A damping device for plucked and bow instruments, comprising two end engaging means and an intermediate engaging means to partially suppress the sound, wholly supported by the strings and engaging the vibratory portions of the strings, the intermediate engaging means being integral with one of the other engaging means.

5. A damping device for plucked and bow instruments comprising two end engaging means and an intermediate engaging means to partially suppress the sound, the two end engaging means and an intermediate engaging means wholly supported by the strings, and each engaging the vibratory portions of the strings of one of said instruments.

In testimony that I claim the foregoing I have hereunto set my hand.

DENNIS EDWARD HARTNETT.

Witnesses:
MINERVA LOBEL,
MARIAN MEIKLE.

Copies of this patent may be obtained for five cents each, by addressing the "Commissioner of Patents, Washington, D. C."